(12) United States Patent
Kawamura et al.

(10) Patent No.: US 6,254,164 B1
(45) Date of Patent: Jul. 3, 2001

(54) VEHICLE OCCUPANT PROTECTION SYSTEM

(75) Inventors: Yasushi Kawamura; Takahiro Kamei, both of Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/627,969

(22) Filed: Jul. 28, 2000

(30) Foreign Application Priority Data

Jul. 30, 1999 (JP) .................................................. 11-216618

(51) Int. Cl.⁷ ............................... B60N 2/04; B60R 21/02
(52) U.S. Cl. ..................... 296/68.1; 297/216.18; 297/216.1
(58) Field of Search ................................ 296/68.1, 65.02, 296/188, 189; 297/216.1, 216.16, 216.13, 216.18

(56) References Cited

U.S. PATENT DOCUMENTS

| 3,897,101 | * | 7/1975 | Hess ..................................... 296/68.1 |
| 5,947,543 | * | 9/1999 | Hubbard .............................. 296/68.1 |
| 6,092,853 | * | 7/2000 | Hubbard .............................. 296/68.1 |

FOREIGN PATENT DOCUMENTS 7-101354   4/1995 (JP) .

OTHER PUBLICATIONS

Patent Abstracts of Japan, JP07101354A http://www.patents.ibm.com/cgi–bin/viewpat.cmd/ JP07101354A2, JPO, 1995.

* cited by examiner

Primary Examiner—D. Glenn Dayoan
Assistant Examiner—Patricia Engle

(57) ABSTRACT

In a vehicle occupant protection system, the seat is subjected to a forward deceleration by a power actuator following a frontal vehicle crash substantially without any time delay, and following a rearward movement of the seat with respect to the vehicle body by a prescribed distance, the seat is subjected to a forward acceleration by a stopper attached to a vehicle body to prevent any excessive rise in the forward deceleration of the vehicle occupant. Thereafter, the vehicle seat is required to move substantially integrally with the vehicle body to allow the vehicle occupant to decelerate at a tolerable deceleration level by virtue of a controlled deformation of the vehicle body, and the one-way motion mechanism ensures the vehicle seat to move jointly with the vehicle body once the stopper has stopped the rearward movement of the seat.

6 Claims, 4 Drawing Sheets

VEHICLE OCCUPANT PROTECTION SYSTEM

TECHNICAL FIELD

The present invention relates to a vehicle occupant protection system, and in particular to a vehicle occupant protection system which can reduce a deceleration acting upon a vehicle occupant at the time of a vehicle crash.

BACKGROUND OF THE INVENTION

In recent years, various proposals have been made in regard to automotive vehicle body structures to maximize the protection of vehicle occupants at the time of a vehicle crash. For instance, proposals have been made to minimize the deceleration of the part of the vehicle body occupied by vehicle occupants by properly selecting the deformation of the remaining part of the vehicle body, and preventing the former part of the vehicle body from deforming (see Japanese patent laid open publication No. 7-101354, for instance).

However, it may be difficult to reduce the deceleration of the vehicle occupant in the case of small cars which do not provide adequate deformation strokes of the parts of the vehicle body other than the part occupied by the vehicle occupant only with such conventional approaches which essentially consist of attempts to reduce the deceleration of the passenger compartment by controlling the deformation mode of the vehicle body.

Further, it is generally impossible to integrally hold a vehicle occupant to a vehicle body even if the seat is fixedly attached to the vehicle body because the seat belt for restraining the vehicle occupant to the seat has an inevitable slack. Thus, when a vehicle crash occurs, the forward inertia force acting upon the vehicle occupant at the time of a vehicle crash starts rising only after the vehicle occupant is fully restrained by the seat belt. Further, because the seat belt inevitably has a certain resiliency, the deceleration acting on the vehicle occupant, who tends to continue to move forward, reaches a maximum level only when the maximum elongation of the seat belt takes place. The maximum deceleration level increases as the forward movement of the vehicle occupant with respect to the vehicle body under the inertia force increases, and is known to substantially exceed the average deceleration of the vehicle body. Therefore, in order to minimize the impact which the vehicle occupant receives at the time of a vehicle crash, it is necessary to minimize the time delay in the rise in the deceleration of the vehicle occupant with respect to the deceleration of the vehicle body and thereby reduce the forward movement of the vehicle occupant with respect to the vehicle body.

Proposals have been made in copending U.S. patent application Ser. Nos. 09/377,366 and 09/376,888 both filed on Aug. 18, 1999, to impart a relative deceleration and acceleration to the vehicle seat or the member carrying the vehicle seat with respect to the main part of the vehicle body so that the vehicle occupant may experience a deceleration from an early stage of a vehicle crash, and the maximum vehicle occupant deceleration may be reduced by distributing the inertia force acting on the vehicle occupant over a longer period of time. There are additional copending U.S. patent applications of later filing dates which also relate to similar subject matters. The contents of these applications are hereby incorporated in this application by reference.

BRIEF SUMMARY OF THE INVENTION

In view of such problems of the prior art and the recognition by the inventors, a primary object of the present invention is to provide a vehicle occupant protection system which allows the peak deceleration acting upon a vehicle occupant at the time of a vehicle crash to be minimized for a given deformation stroke of the vehicle body.

A second object of the present invention is to provide a vehicle occupant protection system which allows the deceleration acting upon the vehicle occupant at the time of a vehicle crash to be spread over time so as to minimize the peak deceleration acting upon the vehicle occupant.

A third object of the present invention is to provide a vehicle occupant protection system which allows the peak deceleration acting upon the vehicle occupant to be minimized even though the size of the vehicle body is limited.

A fourth object of the present invention is to provide a vehicle occupant protection system which is simple in structure, and light in weight.

According to the present invention, such objects can be accomplished by providing a vehicle occupant protection system, comprising: a seat which is fitted with a seat belt, and supported on a vehicle body so as to be slidable in a direction of an input crash load resulting from a vehicle crash; a crash sensor mounted on the vehicle body for detecting a vehicle crash; a power actuator fixedly attached to the vehicle body, and adapted to apply a rearward force to the seat upon occurrence of a vehicle crash; a stopper member fixedly attached to the vehicle body and adapted to stop a rearward movement of the seat produced by the power actuator following a prescribed rearward displacement of the seat; and a one-way motion mechanism for permitting the rearward movement of the seat, but prohibiting any forward movement of the seat after the stopper has stopped the rearward movement of the seat.

Thus, the seat is subjected to a forward deceleration by the power actuator substantially without any time delay, and following a rearward movement of the seat with respect to the vehicle body by a prescribed distance, the seat is subjected to a forward acceleration to prevent any excessive rise in the forward deceleration of the vehicle occupant. Thereafter, the vehicle seat is required to move substantially integrally with the vehicle body, and the one-way motion mechanism ensures the vehicle seat to move jointly with the vehicle body once the stopper has stopped the rearward movement of the seat.

The one-way motion mechanism may comprise a first part attached to the seat and a second part attached to the vehicle body, at least one of the parts being provided with a slope engaged by the other of the parts, and at least one of the parts being resiliently supported by a corresponding one of the seat and vehicle body to accommodate a relative displacement between the two parts in a direction different from that resulting from a rearward movement of the seat. Thereby, the one-way motion mechanism can be made of a simple structure, and adapted to reliable operation. A ratchet mechanism can be conveniently used for such a purpose.

Additionally and/or alternatively, the one-way motion mechanism may comprise a first part attached to the seat and a second part attached to the vehicle body, the first part and second part being positioned in a spaced relationship from each other before activation of the power actuator, and adapted to engaged and lock with each other simultaneously as the stopper has stopped the rearward movement of the seat. For such a purpose, a latch mechanism or similar arrangement using plastic and/or elastic deformation of at least one member for irreversibly joining one member to another as the two member come together.

The power actuator may consist of any actuator which is capable of activating adequately promptly with a required power output. A piston/cylinder arrangement using a pyrotechnic is suited for such a purpose. The crash sensor may consist of a limit switch or a stress sensor for detecting the deformation of a vehicle body part. Alternatively, an acceleration sensor such as those widely used in association with air bag occupant restraint system may also be used. If desired, a radar or laser sensor for detecting a crash before it actually happens can also be used for this purpose.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
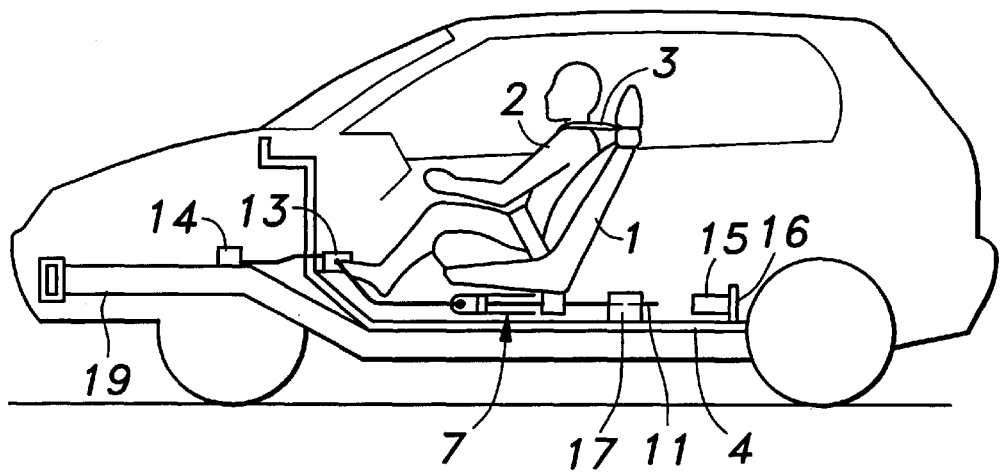
FIG. 1 is a schematic side view of a vehicle body incorporated with a vehicle occupant protection system embodying the present invention.
Figure 2:
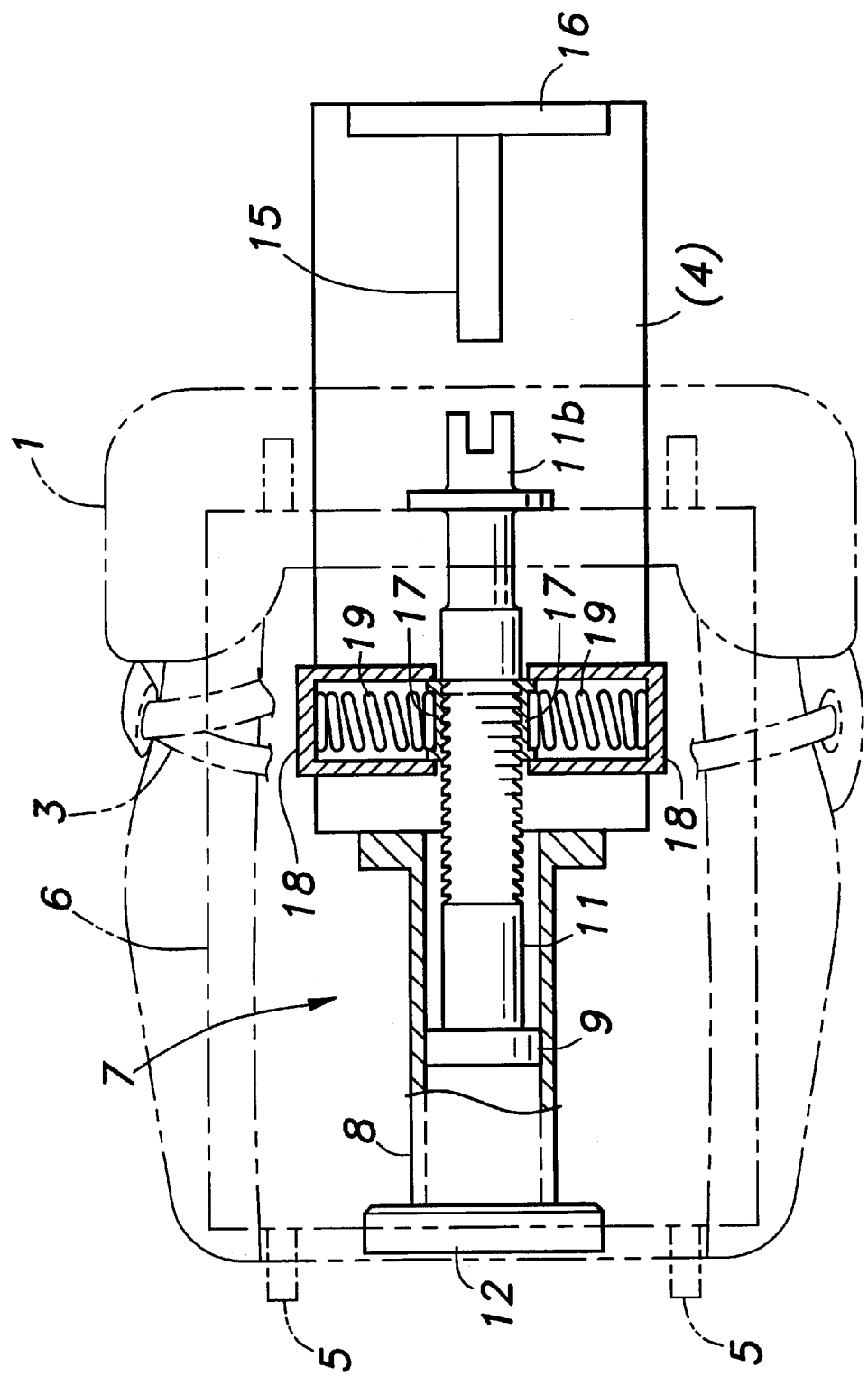
FIG. 2 is a partly broken away enlarged plan view of the vehicle occupant protection system.

FIG. 1 schematically illustrates a vehicle incorporated with a vehicle occupant protection system embodying the present invention. To restrain movement of a vehicle occupant 2 with respect to a seat 1, the seat 1 is fitted with a seat belt 3. The anchor points of the seat 1 may be all provided in the seat 1, or only a part of the anchor points of the seat 1 may be provided in the seat 1 while the remaining anchor points are provided in fixed parts of the vehicle body. The seat 1 is mounted on a support base 6 slidably engaged by guide rails 5 as illustrated in FIG. 2 so as to be moveable over a certain distance along the fore-and-aft direction of the vehicle body with respect to a floor 4 defining a passenger compartment of the vehicle body.

Under the seat 1 is disposed an actuator 7 for producing a drive force for moving the seat 1, along with the support base 6, rearwardly along the guide rails 5. As also shown in FIG. 2, the actuator 7 comprises a cylinder 8 fixedly attached to the floor 4, a piston 9 slidably received in the cylinder 8, a piston rod 11 connecting the support base 6 and the piston 9 with each other, and a gas generator 12 for producing high pressure gas and applying a drive force to the piston 9.

The gas generator 12 is electrically connected to a control unit 13, and can produce high pressure combustion gas by igniting a propellant received therein with electric current from the control unit 13. The control unit 13 supplies ignition current to the gas generator 12 upon detecting a vehicle crash from a signal of a deceleration sensor 14 placed in a suitable part of the vehicle body.

A stopper 15 is provided in a part of the floor 4 behind the seat 1 to limit the rearward movement of the seat 1 to be within a prescribed distance. It is also possible to provide a stopper structure in the top end of the cylinder inside the actuator 7 to achieve a similar result. The illustrated stopper 15 consists of a plate member which projects from a front face of a rigid wall section 16 which stands upright integrally from the floor 4.

A pair of moveable clamp members 17 are provided on either side of the piston rod 11. As best shown in FIG. 2, the moveable clamp members 17 are disposed on either lateral side of the piston rod 11, and are received in corresponding clamp member guides 18 which are fixedly attached to the floor 4 of the vehicle body, and guide the corresponding clamp members 17 for movement in a direction perpendicular to the axial line of the piston rod 11. Compression coil springs 19 received in the clamp member guides 18 resiliently urge the clamp members 17 toward the piston rod 11.

Figure 3:
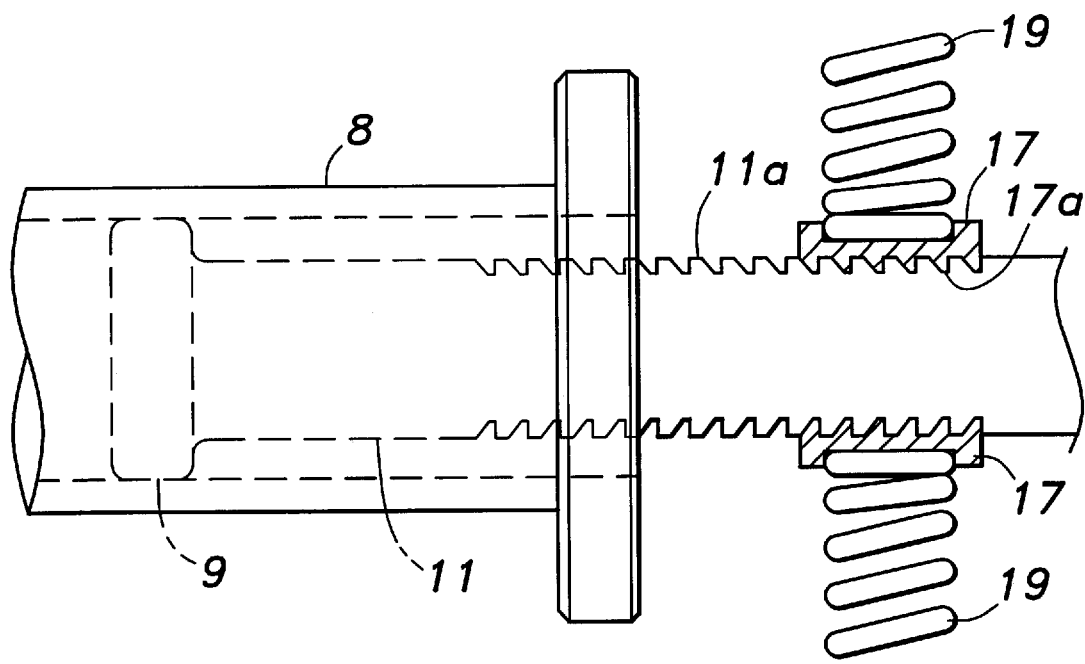
FIG. 3 is an enlarged view showing a part of FIG. 2.

The piston rod 11 and each of the moveable clamp members 17 engage each other via a teeth section 11a and a pawl section 17a provided in the piston rod 11 and clamp member 17, respectively, as best shown in FIG. 3. The engagement teeth section 11a and the pawl section 17a are provided with complementary shapes at the interface in such a manner that the slope on each teeth of the engagement teeth section 11a faces rearward with respect to the vehicle body, and the slope on each pawl of the pawl section 17a faces forward with respect to the vehicle body. The vertical side of each teeth of the engagement teeth section 11a (a plane extending perpendicularly to the axial line of the piston rod 11) and the vertical side of each pawl of the pawl section 17 are adapted to engage each other.

Figure 4A:
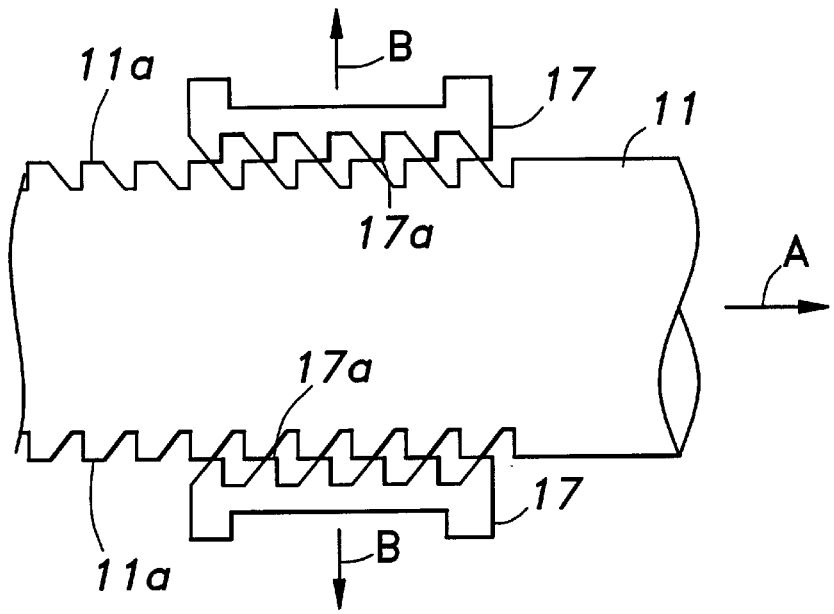
FIGS. 4a and 4b are views similar to FIG. 3 showing the mode of operation of the one-way motion mechanism.

The mode of operation of the device of the present invention is described in the following by taking an example of a vehicle crashing head-on onto an object on the road with reference to FIGS. 3 and 4.

Upon the occurrence of a vehicle crash, a pair of side beams 16 which are integral with the floor 4 and extend in the forward direction start a compressive deformation under an impact load applied to the front ends thereof. At this time, the floor 4 continues to move forward by a stroke accommodated by the compression of the side beam 16 while receiving a deceleration due to the deformation stress produced in the side beams 16.

When the control unit 13 judges that the vehicle occupant protection system should be activated according to the signal from the deceleration sensor 14, electric current is supplied to the gas generator 12 to ignite the high pressure gas therein. As a result, the high pressure gas produced from the gas generator 12 is supplied to the bottom end of the cylinder 8, and the piston 9 is pushed rearward under the pressure of the high pressure gas. At this time, the slopes on the teeth section 11a and the pawl section 17a cause the clamp members 17 to be pushed sideways away from the piston rod 11, and allows the piston rod 11 to move rearward.

Figure 5:
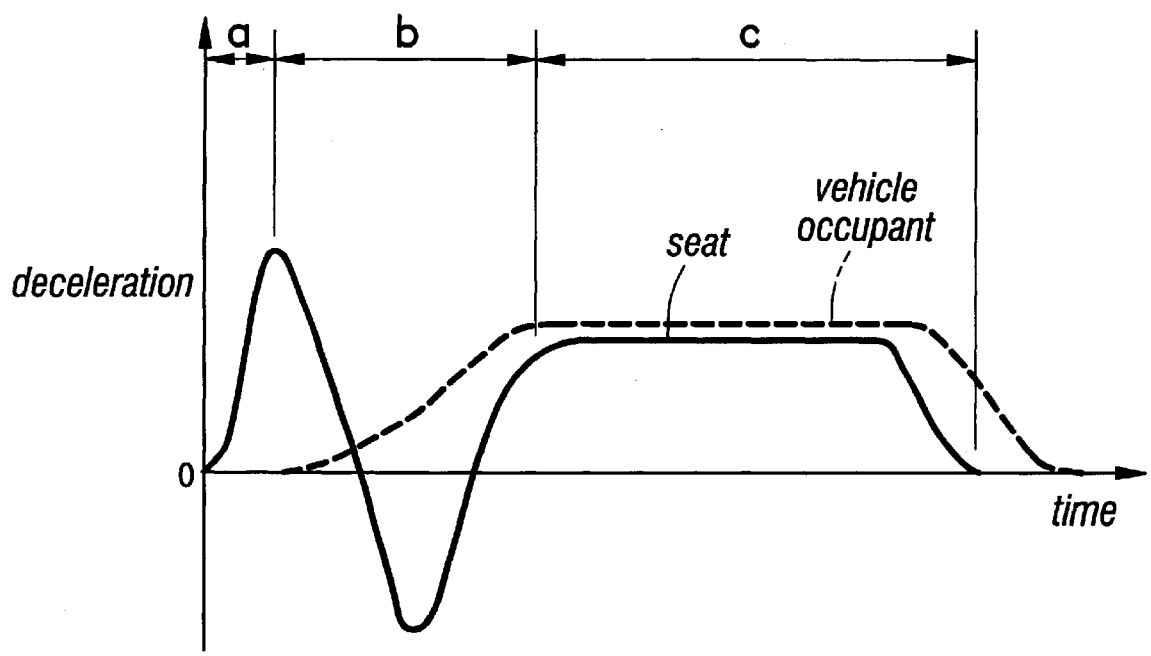
FIG. 5 is a graph showing the time histories of deceleration at the time of the vehicle crash.

As the piston 9 is pushed out under the pressure of the gas, the support base 6 connected to the piston 9 via the piston rod 11, hence the seat 1, is subjected to a rearward acceleration or a deceleration in the direction of the crash impact load, and the seat 1 starts moving rearward with respect to the floor 4. Therefore, a deceleration of a higher level than that applied to the floor 4 or the passenger compartment of the vehicle body is applied to the seat 1 (interval a of FIG. 5). During this process, the vehicle occupant 2 tends to move forward under the inertia force with respect to the vehicle body which is coming to a stop. Because the seat 1 is subjected to a rearward acceleration immediately following the crash, the seat belt 3 which is integral with the seat 1 instantaneously restrains the vehicle occupant to the seat 1 substantially without creating any relative speed between the vehicle occupant 2 and the floor 4.

Then, the projecting end 11b of the piston rod 11 abuts the stopper 15, and a reaction load due to the resultant plastic deformation of the stopper 15 decelerates the piston 9. The projecting end 11b is U-shaped with an open end thereof facing the stopper 15 so that the projecting end 11b catches the stopper 15 at the time of the crash, and the two parts can be held in the mutually abutting state without fail.

At the same time, because the vertical sides of the teeth and pawls of the teeth section 11a and pawl section 17a engage each other, the piston rod 11 is positively prevented from moving forward with respect to the clamp members 17 or the vehicle body.

During a final phase of the crash, the deceleration of the seat 1 again rises sharply upon completion of the operation of the actuator 7 (piston rod 11) (later part of interval b of FIG. 5), and the deceleration continues with the seat 1 integrally attached to the floor 4 at a deceleration level determined by the deformation stress of the side beams 19. Under this condition, the relative speed between the vehicle occupant 2 and the floor 4 is zero, and because the restraining load of the seat belt 3 balances out with the vehicle body deceleration during the final phase of the crash, the vehicle occupant 2 continues to decelerate, integrally with the floor 4 (interval c of FIG. 5). Under this condition, the vehicle occupant deceleration is equal to the vehicle body deceleration until the vehicle body comes to a complete stop.

It is an important factor to minimize the vehicle occupant deceleration in view of reducing the impact which is sustained by the vehicle occupant 2 at the time of a vehicle crash. However, the vehicle occupant deceleration can be reduced from the level of the prior art if the time history of deceleration is controlled (as indicated by the solid lines in FIG. 5) in such a manner that a deceleration which is higher than the average vehicle body deceleration is applied to the seat 1 and the seat belt 3 for a short period of time during an early phase of a vehicle crash, and following a short interval of applying a reverse deceleration to the seat 1 and the seat belt 3, a same deceleration as the average vehicle body deceleration is applied to the seat 1 and the seat belt 3.

To enhance the effect of the present invention which was described above, it is preferable to suitably select the mechanical strength of the side beams 19, the resilient property of the seat belt 3, and the output property and the ignition timing of the actuator 7 so as to bring the relative speed between the vehicle occupant 2 and the floor 4 as close to zero as possible, and to balance out the restraining load of the seat belt 3 with the vehicle body deceleration during the final phase of the crash when the relative speed between the seat 1 and the floor 4 is reduced to zero and the deceleration levels of these two parts have been brought equal to each other. Also, in interval c of FIG. 5, it is preferable to allow the seat 1 to decelerate jointly with the floor 4 following the rearward displacement of the seat 1. To this end, the forward movement of the piston rod 11 which is integral with the seat 1 is prohibited.

The pair of moveable clamp members 17 resiliently clamp the piston rod 11 under normal condition. However, the rearward movement of the seat 1 is permitted owing to the prescribed shapes of the engagement teeth section 11a and the pawl section 17a as mentioned earlier. More specifically, as the seat 1 moves rearward, and the piston rod 11 moves in the direction indicated by arrow A in FIG. 4a, the slopes of the teeth and pawl of the engagement teeth section 11a and pawl section 17a abut each other, and the slopes of the teeth of the engagement teeth section 11a ride over the slopes of the pawls of the pawl section 17a so that the two clamp members 17 are pushed away from each other against the resilient biasing force as indicated by arrow B, and the piston rod 11 can move rearward.

Figure 4B:
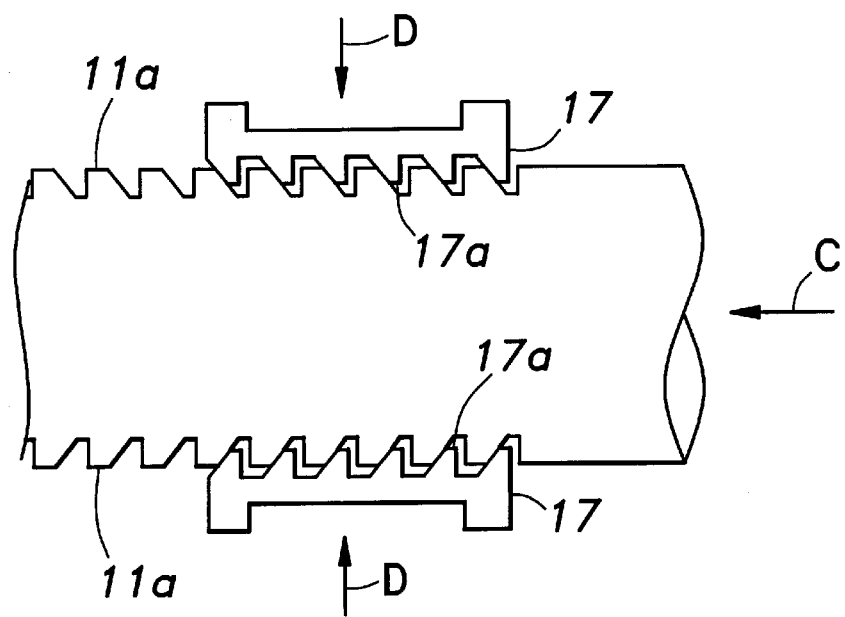

On the other hand, when the seat 1 moves forward (relative to the floor 4) as indicated by arrow C in FIG. 4b, the vertical surfaces of the teeth of the engagement teeth section Ha engage the vertical surfaces of the pawls of the pawl section 17, and because the moveable clamp members 17 are resiliently urged in the direction (indicated by arrow D in the drawing) to clamp the piston rod 11, the engagement between the vertical surfaces is firmly retained, and the seat 1 is prevented from moving forward. Therefore, as soon the rearward drive force by the explosive force falls below the reaction load resulting from the abutment onto the stopper 15 and the resistance due to the resilient clamping force of the moveable clamp members 17, the rearward movement of the seat 1 ceases, and the seat 1 remains stationary with respect to the vehicle body which moves forward so that the deceleration level owing to the integral attachment between the seat 1 and the vehicle body 4 can be achieved as indicated by interval c in the drawing.

Although the present invention has been described in terms of a preferred embodiment thereof, it is obvious to a person skilled in the art that various alterations and modifications are possible without departing from the scope of the present invention which is set forth in the appended claims. For instance, the seat 1 was directly mounted on the piston rod 11 in the above described embodiment, but a separate frame supporting the seat 1 may be connected to a working end of the actuator 7 such as the piston rod 11. Also, the bifurcated end 11b of the piston rod 11 may be replaced with any known arrangement for latching the piston rod or a member connected thereto with a fixed part of the vehicle body upon abutment. The arrangement using the engagement teeth section 11a and the pawl section 17a is only an example of the one-way motion mechanism, and may consist of any per se known arrangement for permitting the relative motion only in one direction.

What is claimed is:

1. A vehicle occupant protection system, comprising:
   a seat which is fitted with a seat belt, and supported on a vehicle body so as to be slidable in a direction of an input crash load resulting from a vehicle crash;
   a crash sensor mounted on the vehicle body for detecting a vehicle crash;
   a power actuator fixedly attached to the vehicle body, and adapted to apply a rearward force to said seat upon occurrence of a vehicle crash;
   a stopper member fixedly attached to the vehicle body and adapted to stop a rearward movement of said seat produced by said power actuator following a prescribed rearward displacement of said seat; and
   a one-way motion mechanism for permitting said rearward movement of said seat, but prohibiting any forward movement of said seat after said stopper has stopped the rearward movement of said seat.

2. A vehicle occupant protection system according to claim 1, wherein said one-way motion mechanism comprises a first part attached to said seat and a second part attached to said vehicle body, at least one of said parts being provided with a slope engaged by the other of said parts, and at least one of said parts being resiliently supported by a corresponding one of said seat and vehicle body to accommodate a relative displacement between said two parts in a direction different from that resulting from a rearward movement of said seat.

3. A vehicle occupant protection system according to claim 2, wherein said first part is formed with an engagement teeth section formed with saw teeth, and said second part is provided with a pawl section which is adapted to engage said engagement teeth section against a forward movement of said first part relative to said vehicle body, and resiliently disengage from said engagement teeth section for a rearward movement of said first part relative to the vehicle body.

4. A vehicle occupant protection system according to claim 1, wherein said one-way motion mechanism comprises a first part attached to said seat and a second part attached to said vehicle body, said first part and second part being positioned in a spaced relationship from each other before activation of said power actuator, and adapted to engaged and lock with each other simultaneously as said stopper has stopped the rearward movement of said seat.

5. A vehicle occupant protection system according to claim 1, wherein said power actuator comprises a cylinder, a piston received in said cylinder, and a propellant received in said cylinder.

6. A vehicle occupant protection system according to claim 5, wherein said crash sensor comprises a deceleration sensor mounted on said vehicle body.

* * * * *